(12) United States Patent
Richter et al.

(10) Patent No.: US 12,346,490 B2
(45) Date of Patent: Jul. 1, 2025

(54) SYSTEM FOR PROTECTING ELECTRONIC DEVICES FROM COUNTERFEITING

(71) Applicants: Wolfgang Richter, Vancouver (CA); Faranak Zadeh, Vancouver (CA)

(72) Inventors: Wolfgang Richter, Vancouver (CA); Faranak Zadeh, Vancouver (CA)

(73) Assignee: EPIC SEMICONDUCTORS INC

( * ) Notice: Subject to any disclaimer, the term of this patent is extended or adjusted under 35 U.S.C. 154(b) by 812 days.

(21) Appl. No.: 17/577,641

(22) Filed: Jan. 18, 2022

(65) Prior Publication Data

US 2022/0138357 A1 May 5, 2022

Related U.S. Application Data

(63) Continuation-in-part of application No. 17/067,660, filed on Oct. 10, 2020, which is a continuation-in-part of application No. 16/915,318, filed on Jun. 29, 2020.

(60) Provisional application No. 62/869,183, filed on Jul. 1, 2019.

(51) Int. Cl.
*G06F 21/86* (2013.01)
*G06F 21/79* (2013.01)

(52) U.S. Cl.
CPC .............. *G06F 21/86* (2013.01); *G06F 21/79* (2013.01)

(58) Field of Classification Search
CPC .......... G06F 21/86; G06F 21/87; G06F 21/70; G06F 21/71; G06F 21/75; G06F 21/79
See application file for complete search history.

(56) References Cited

U.S. PATENT DOCUMENTS

| | | | | |
|---|---|---|---|---|
| 9,052,387 | B2* | 6/2015 | Akcasu | G06F 21/86 |
| 9,852,422 | B1* | 12/2017 | Wade | G06K 7/087 |
| 10,139,846 | B2* | 11/2018 | Motsenbocker | G05F 1/67 |
| 10,713,347 | B2* | 7/2020 | Talwerdi | G06F 21/34 |
| 10,758,818 | B2* | 9/2020 | Barney | A63F 13/24 |
| 11,480,445 | B2* | 10/2022 | Campbell | G06F 21/86 |
| 11,669,648 | B2* | 6/2023 | Achillopoulos | G06F 21/72 713/193 |
| 11,727,158 | B2* | 8/2023 | Gaine | G06F 21/75 713/194 |
| 11,734,406 | B2* | 8/2023 | Law | G06Q 20/40145 705/41 |
| 12,026,709 | B2* | 7/2024 | Vargas | G07F 7/122 |
| 2022/0246538 | A1* | 8/2022 | Miyamoto | H01L 24/08 |

* cited by examiner

*Primary Examiner* — Hosuk Song

(57) ABSTRACT

Disclosed is a system for protecting electronic devices from counterfeiting and misuse. The system includes a hub unit and a smart switch. The hub unit includes a generator, a modulator and a first conductive surface. The smart switch is connected to sub-circuits and capacitively coupled to the hub unit. The smart switch includes a transmission gate, a second conductive surface, a rectifier, a buffer, a demodulator, and a latch. The smart switch receives switching instructions over an alternating electric field from the hub unit to operate the electronic device.

14 Claims, 2 Drawing Sheets

SYSTEM FOR PROTECTING ELECTRONIC DEVICES FROM COUNTERFEITING

CROSS REFERENCE TO RELATED APPLICATION

The present application is a continuation-in-part of U.S. patent application Ser. No. 17/067,660 entitled "System for measuring charges propagating through a biological object" filed on Oct. 10, 2020, further the application Ser. No. 17/067,660 is a continuation-in-part of U.S. patent application Ser. No. 16/915,318, entitled "AN APPARATUS FOR MEASURING VITAL SIGNS," filed on Jun. 29, 2020, further the U.S. patent application Ser. No. 16/915,318 claims the benefit of U.S. Provisional Application No. 62/869,183, filed Jul. 1, 2019, which are incorporated by reference in their entirety.

BACKGROUND OF THE INVENTION

1. Field of the Invention

The present invention generally relates to protection of electronic devices, and more particularly relates to a system for protecting electronic devices from counterfeiting.

2. Description of Related Art

Counterfeiting as an international industry covers virtually everything made or manufactured, from auto parts to purses and watches to prescription drugs. In contrast to other counterfeit items, the ramifications of a counterfeit integrated electronic circuit (IC) device failure in an electronic system are more than just inconvenience or a minor loss of money.

The manufacture of counterfeit electric, electromechanical and electronic (EEE) parts isn't a new problem for the rugged computing industry, but sadly, it's a problem that continues to cost manufacturers billions of dollars, harm the livelihoods of working Americans and jeopardize critical national security initiatives.

Chipmakers spend hundreds of millions of dollars to develop and build new integrated circuits with astonishing mind blowing features. Counterfeiters are waiting for that to copy such elaborate designs the easy way—creating enormous economic damage. An IC failure due to a counterfeit part is very serious. When the counterfeit IC fails, it can inflict serious injury, or at a minimum interrupt or delay a mission. It ranks with counterfeit drugs that can cause an individual to be over or under medicated.

There is something even more frightening with this situation: many low-grade legitimate parts are being remarked to a higher grade and getting into critical electronic systems. When this happens, the counterfeit inferior parts will work suitably for a short while, but only for a while. They are stressed from the outset and it is highly likely that they will fail.

Therefore there is a need of a system for protecting electronic devices from counterfeiting. The system should include an electronic unit that provides protected access to integrated smart switches that control the operation of the electronic devices.

SUMMARY OF THE INVENTION

In accordance with teachings of the present invention, a system for protecting electronic devices from misuse is provided in accordance with an embodiment of the present invention.

An object of the present invention is to provide a system with a hub unit and a smart switch. The hub unit includes a generator, a modulator and a first conductive surface. The smart switch is connected to sub-circuits and capacitively coupled to the hub unit. The smart switch includes a transmission gate, a second conductive surface, a rectifier, a buffer, a demodulator, and a latch.

The hub unit generates and emits modulated data having switching instructions over an alternating electric field. The smart switch operates the electronic devices on receiving the modulated data and switching instructions over the alternating electric field. The receiving of switching instructions over the alternating electric field ensures the safety of the electronic device and protects them from getting misused or counterfeit.

Another object of the present invention is to provide the hub unit with a controller for contactlessly power and communicate the data with the smart switch, and a filter unit for mixing the data received from the controller with alternating electric charges and further the filter unit filters and directs the data from the smart switch to the controller.

Another object of the present invention is to provide the system with a bonding pad on the protected IC as the second conductive surface while the latch is e.g. a part of an IC memory. Also, the alternating electric field may be conducted via a printed conductive structure attached to the electronic device.

Another object of the present invention is to provide the hub unit with a bi-directional communication unit which is coupled to the controller to communicate the data over a communication network. Further, the transmission gate is a toggle switch.

Another object of the present invention is to provide the system with an array of switches to temporarily power and connect the sub-circuits of the electronic device to other sub-circuits under control of the alternating electric field. The array of switches allows a user to control multiple electronic devices through a single hub unit.

Another object of the present invention is to provide the system wherein the data is provided by the hub unit where the alternating electric field instructs the smart switch to prevent the electronic device from misuse. Further, the device is operable only on receiving the switching instructions from the hub unit via the alternating electric field, to prevent any misuse.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF DRAWINGS

The annexed drawings, which are not necessarily to scale, show various aspects of the inventions in which similar reference numerals are used to indicate the same or similar parts in the various views.

DETAILED DESCRIPTION OF DRAWINGS

Figure 1:
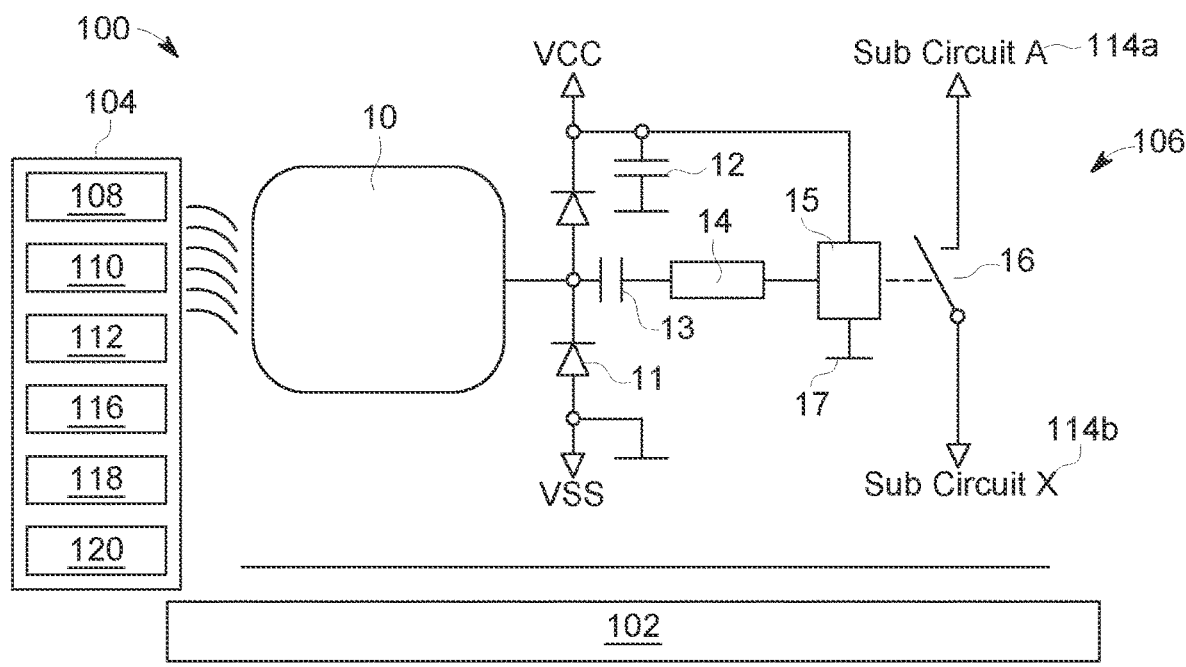
FIG. 1 illustrates a schematic diagram of a smart switch in accordance with an embodiment of the present invention.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

FIG. 1 illustrates a schematic diagram of a system 100 for protecting an electronic device 102 in accordance with an embodiment of the present invention. The system includes a hub unit 104 and a smart switch 106. The hub unit 104 includes a generator 108, a modulator 110 and a first conductive surface 112.

The generator 108 provides an electrical frequency. Examples of the generator include but are not limited to oscillators, PWM, toggled I/O pins, PLL, etc. The modulator 110 modulates the frequency with data and switching instructions. Examples of the modulator 110 include but are not limited to a digital gate, mixer, transistor, DAC, I/O port, electronic switch, etc.

The first conductive surface 112 is connected to the modulator and emits the modulated frequency via a modulated alternating electric field. Examples of the first conductive surface 112 include but not limited to a metal surface, PCB traces, conductive printable material (e.g. paint), and conductive polymers or liquids.

The smart switch 106 is connected to sub-circuits 114a, 114b of the electronic device 102. The smart switch 106 includes a transmission gate 16, a second conductive surface 10, a rectifier 11, a buffer 12, a demodulator 14, and a latch 15. Examples of the sub-circuits 114a, 114b include but are not limited to analog or digital electronic function blocks or cells, digital gates, amplifiers, comparators, memory cells, registers, voltage sources, current sources, drivers, level shifters, etc.

The transmission gate 16 connects electrical levels and signals between the sub-circuits 114a, 114b. Examples of the transmission gate 16 include but are not limited to an integrated electronic toggle switch, MOSFET, Opto Coupler, (solid state) relays, etc.

The second conductive surface 10 is influenced by the modulated alternating electric field emitted from the first conductive surface 112. In a preferred embodiment of the present invention, the second conductive surface 10 is a bonding pad of an integrated circuit. Examples of the second conductive surface 10 include but are not limited to integrated metallic layers, connectors, solder pad/pins, internal or external (as an extension) conductive structures (e.g. metallic company logo, serial number, etc.), etc.

The rectifier 11 is connected to the second conductive surface 10 to rectify electrical charges caused by the received modulated alternating electric field. Examples of the rectifier 11 include but are not limited to an ESD clamp (diode), resonator, cascade, diode (bridges, e.g. Graetz), (solid state) transformer, and level shifter or charge pumps, phase controlled (MOSFET-) switches, half- or fullwave rectifiers, ideal diodes, etc. The buffer 12 accumulates the electrical charges as a DC energy. Examples of the buffer 12 include but are not limited to a capacitor, accumulator, silicon battery, etc.

The demodulator 14 is powered by the DC energy to create demodulated switching instructions from the data modulated into the alternating electric field by the modulator 110 of the hub unit 104. Examples of the demodulator 14 include but are not limited to a phase detector, PLL, AM/FM/IQ demodulator circuit, pulse counters, etc.

The latch 15 is controlled by the DC energy to store the demodulated switching instructions. Further, the latch 15 is connected to the transmission gate 16. Examples of the latch 15 include but are not limited to flip flops, (flash or NV) memory 5 cell, (EE-) Prom, ROM, RAM. The latch 15 may be a part of an IC (e.g. RAM/ROM memory) that is used to store (program) data or information. The latch 15 is connected to VCC and VSS with a common ground 17.

Examples of the data and switching instructions include but are not limited to identifiers, codes, numbers, data telegrams, sequences, or other signals, instructions for operating the smart switch, etc. Further, the data and switching instructions include a remote testing signal for testing (e.g. contactless boundary scan) the functions of the integrated chip (IC). The switching instructions include commands/signals to operate (on/off/perform specific instructions) the IC etc.

In another embodiment of the present invention, the hub unit 104 further includes a controller 116 and a filter unit 118 for mixing the data received from the controller 116 with alternating charges. Further, the filter unit 118 also filters and directs data from the smart switch 106 to the controller 116.

Examples of the controller 116 include but are not limited to a microcontroller, FPGAs, PLC, processors, sequencers, etc. Examples of the filter unit 118 include but are not limited to a (band/high/low) pass, (diodes) mixer, Gilbert cell, PLL, (mulitplier) OpAmps, etc. or passive (L/R/C) networks (e.g. blocking capacitor 13).

In another embodiment of the present invention, the hub unit 104 further includes a bi-directional communication unit 120 coupled to the controller 116 to communicate the data over a communication network. Examples of the bi-directional communication unit 120 include but are not limited to RF, IR, Wi-Fi, Bluetooth, GSM, CDMA, LTE, 5G, LAN, WAN, ZigBee, or other communication units.

In another embodiment of the present invention, the system 100 further includes an array of smart switches to temporarily power and connect the electronic sub-circuits of the electronic device 102 to other sub-circuits under control of the alternating electric field.

Another embodiment of the present invention is to provide the system 100 wherein the alternating electric field is conducted via a printed conductive structure attached to the electronic device 102. The printed conductive structure may be hidden, a unique registration number, a company logo, a special sign or character, etc.

The data (preferably secret, or encrypted, or registered) provided by the hub unit 104 via the alternating electric field instructs the smart switch 106 to perform the switching instructions inside the electronic device 102, which results in prevention of the electronic device 102 from misuse.

Figure 2:
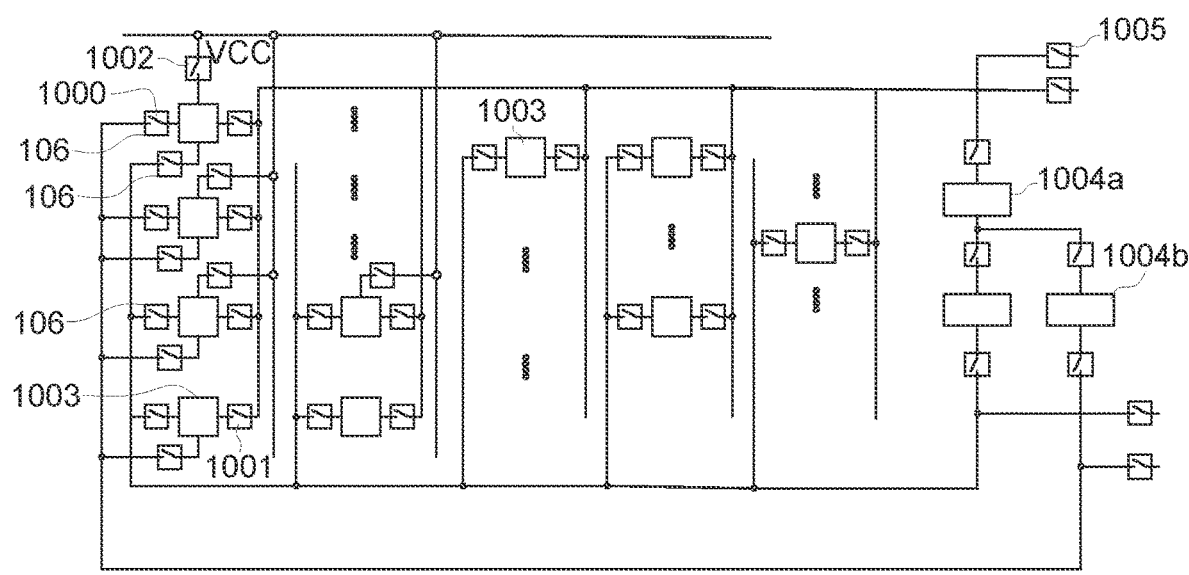
FIG. 2 illustrates a schematic diagram of a plurality of smart switches interacting with integrated electronic sub-circuits and peripherals.

FIG. 2 illustrates a schematic diagram of intervention of smart switches 106 with sub-circuits 1003 in an embodiment of the present invention. The smart switches are only (de-)activated under the influence of the data modulated alternating electric field. The related smart switch 106 connects electrical signals to inputs 1000 or from outputs 1001 of electronic sub-circuits 1003.

Further, operation power for the sub-circuits 1003 can be applied via the smart switch 106 connected to a power rail 1002. Similarly, each sub-circuit 1003 inside an IC, gets powered and connected from the smart switches. The smart switches 106 are powered and instructed via the provided modulated alternating electric field.

Examples of the sub-circuits 1003 include but are not limited to analog, digital, opto-electronic, MEMS, electromagnetic or electrophoretic, or other electrical or electronic circuits. The smart switches 106 also connect signals to sample-and-hold circuits 1004a/b or to an I/O 1005 to connect internal or external peripherals (not shown in FIG. 2).

In another embodiment of the present invention, the smart switch also (dis-)connects power rails to sub-circuits. Further, the smart switches can toggle signals or voltage levels to and from sub-circuits to change their functionality or enable/disable parts or the complete integrated circuit.

In another embodiment of the present invention, the smart switches are operated (activated or deactivated) from Flash memory, EPROM, ROM, or RAM cells. The smart switches allow to alter the configuration or functionality of the sub-circuits of the electronic device. The alteration could be temporary or permanent. Examples of the sub-circuits include but are not limited to amplifiers, filters, comparators, counters, digital gates, registers (or peripherals) of MCUs, FPGAs, SOCs etc.

For example, a chip manufacture has invented a remote new sensing chip. The manufacture wants this sensing chip to operate only in a remote environment under specific conditions (e.g. in automotive, medical, industrial environment), and if the chip is outside of these conditions, the chips cease to work or gives false data. Thus, the present invention assists by providing selective operation by providing switching instructions inside the environment to disable the chip from operations to get counterfeit.

The present invention offers various advantages such as protecting an electronic device from getting misused or counterfeit, by sending switching instructions over the alternating electric field to make it impossible for anyone to perform reverse engineering to identify the working principle of the electronic device.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such a term is intended to be inclusive in a manner similar to the term "comprising" as "comprising" is interpreted when employed as a transitional word in a claim.

The invention claimed is:

1. A system for protecting electronic devices from misuse, the system comprising:
    a hub unit comprising:
        a generator to provide an electric frequency;
        a modulator to modulate the electric frequency with data and switching instructions; and
        a first conductive surface connected to the modulator to emit the modulated electric frequency via a modulated alternating electric field; and
    a smart switch connected to sub-circuits of the electronic device and capacitively coupled to the hub unit, the smart switch comprising:
        a transmission gate to connect electrical levels and signals between the sub-circuits;
        a second conductive surface to be influenced by the modulated alternating electric field emitted from the first conductive surface;
        a rectifier connected to the second conductive surface to rectify electrical charges caused by the received modulated alternating electric field;
        a buffer to accumulate the rectified electrical charges as a DC energy;
        a demodulator powered by the DC energy to create demodulated switching instructions from the data modulated into the electric frequency by the modulator of the hub unit; and
        a latch controlled by the DC energy to store the demodulated switching instructions received from the demodulator, further the latch is configured to connect to the transmission gate, wherein the switching instructions ensures the safety of the electronic device.

2. The system according to claim 1, wherein the hub unit further comprising:
    a controller to contactlessly power and communicate the data and the switching instructions with the smart switch; and
    a filter unit for mixing the data received from the controller with alternating charges, further the filter unit filters and directs data from the smart switch to the controller.

3. The system according to claim 1, wherein the second conductive surface is a bonding pad of an integrated circuit (IC).

4. The system according to claim 1, wherein the latch is a part of an IC memory.

5. The system according to claim 1 wherein the hub unit further comprising a bi-directional communication unit coupled to the controller to communicate the data over a communication network.

6. The system according to claim 1 further comprises an array of smart switches to temporarily power and connect the electronic sub-circuits of the electronic device to other sub-circuits under control of the alternating electric field.

7. The system according to claim 1 wherein the alternating electric field is conducted via a printed conductive structure attached to the electronic device.

8. The system according to claim 1 wherein the data provided by the hub unit via the alternating electric field instructs the smart switch to prevent the electronic device from misuse.

9. The system according to claim 1 wherein the electronic device is operable only on receiving the switching instructions from the hub unit via the alternating electric field, to prevent any misuse.

10. The system according to claim 1 wherein the transmission gate is a toggle switch.

11. The system according to claim 1 wherein the smart switch connects signals to sample and hold sub-circuits to connect to peripherals circuits and sub-circuits of the electronic device.

12. The system according to claim 1 wherein the smart switches connect signals to and from I/O ports of the electronic device to connect to peripheral circuits and sub-circuits of the electronic device.

13. The system according to claim 1 wherein the smart switch uses the switching instructions received via the modulated electric field to configure the sub-circuits of the electronic device.

14. The system according to claim 3 wherein the smart switch toggle voltage levels to and from sub-circuits to operate the integrated circuit.

\* \* \* \* \*